Feb. 17, 1959   J. BEHRE ET AL   2,873,919
VAPORIZATION PROCESS AND FURNACE FOR PRODUCING
FINE INORGANIC PIGMENTS
Filed Dec. 23, 1955   2 Sheets-Sheet 1

INVENTORS
JOHANNES BEHRE
IRA WILLIAMS
BY
ATTORNEYS

Feb. 17, 1959   J. BEHRE ET AL   2,873,919
VAPORIZATION PROCESS AND FURNACE FOR PRODUCING
FINE INORGANIC PIGMENTS
Filed Dec. 23, 1955   2 Sheets-Sheet 2

*INVENTORS*
JOHANNES BEHRE
IRA WILLIAMS
BY
*ATTORNEYS*

United States Patent Office 2,873,919
Patented Feb. 17, 1959

2,873,919

VAPORIZATION PROCESS AND FURNACE FOR PRODUCING FINE INORGANIC PIGMENTS

Johannes Behre, Hamburg-Wellingsbuttel, Germany, and Ira Williams, Borger, Tex., assignors to J. M. Huber Corporation, Borger, Tex., a corporation of New Jersey Application December 23, 1955, Serial No. 555,171

15 Claims. (Cl. 241—23)

The present invention relates to a process for producing finely divided inorganic fillers or pigments from refractory materials and to a furnace for use in the practice of the process.

Finely divided particles of inorganic materials such as silica, ferric oxide, alumina, sodaglass, and the like, are useful for a wide variety of industrial purposes, especially if they are available in pigmentary or sub-micron particle sizes. They are useful, for instance, as reinforcing filler materials for rubber and plastic compositions, as ingredients of paints and other protective coatings, as insecticide diluents, lubricant thickeners, tableting adjuvants, in printing inks, as textile finishing additives, in paper manufacture and paper coatings, and for various other purposes. Heretofore, such mineral pigment materials have been prepared by various processes.

The widely used wet processes consist in precipitating, for instance, hydrated silica, alumina, or ferric oxide from suitable salt solutions and heating the resulting slurry under conditions whereby conversion of the hydrated oxide into the oxidic pigment is effected. Such wet processes, however, have the disadvantage that they do not yield particles of regular spherical shape and that it is very difficult to produce particles of uniform sub-micron size.

Finely divided spherical silica has also been produced by burning ethyl silicate or like organic materials and collecting the resulting combustion products. Another process of manufacturing, for instance, silicon, iron, or aluminum oxides, involves vaporization of silicon, iron, or aluminum chlorides and burning the chloride vapors in mixture with hydrogen or other combustible gases. Thereby, finely divided spherical silica, alumina, or ferric oxide is obtained.

Other processes involve condensation of, for instance, silica vapors obtained either by vaporization of silica or by oxidation of silicon monoxide vapors produced from a siliceous material. Finely divided spherical particles also are formed in these ways. To carry out such a process silica, for instance, is vaporized in an electric arc and the vapors produced are condensed to particles that vary in size. These processes, however, are difficult to control, and the furnace rapidly disintegrates at the high temperature required for the vaporization. In many instances, the furnace is also damaged by the corrosive action of the vapors. For instance, the temperatures required to vaporize silica are sufficiently high to fuse the surface of the inner furnace walls which ordinarily consist of high temperature resistant alumina silica refractories. When sodium, calcium, and/or iron are present in the vapors, the furnace walls are subject to rapid corrosion. In addition to these difficulties, the carbon electrodes used to form the arc, are rapidly consumed by the oxygen of the vaporized minerals.

It is an object of the present invention to provide a process and furnaces for producing finely divided mineral pigments of sub-micron particle size by the vaporization of refractory inorganic materials and subsequent condensation of the vapors, without damage to the furnace walls.

Another object of the invention is to provide a process and furnaces by which finely divided spherical particles of sub-micron size and useful as a pigment or filler material can be produced economically from a wide variety of refractory inorganic materials.

Other objects of the present invention and advantageous features thereof will become apparent as the description proceeds.

In principle, the process according to the present invention consists in producing a finely divided inorganic pigment or filler material from a refractory inorganic material, usually one of oxidic nature, by melting and boiling a mass of said refractory material within an upright furnace chamber in a zone spaced inwardly from the walls and located in a lower portion of said chamber, while simultaneously flowing a cooling gas downwardly along the side walls thereof and then inwardly over the boiling mass so that the gas mixes with and dilutes vapors of said material rising from said mass, and condensing the vapors in the resulting gaseous mixture in a zone of the chamber above the boiling mass. The resulting gaseous suspension of finely divided inorganic particles is drawn upwardly and taken off through an upper part of the furnace chamber, from which it is passed to suitable cooling and collecting equipment where the desired pigment or filler material is separated from the carrying gas.

The flow of cooling gas directed downwardly along the side walls of the furnace chamber absorbs part of the heat radiated from the localized melting and boiling zone and forms a protective blanket over the exposed surface of said walls to limit their temperature and thus preserve the structure of the furnace. While passing along those walls, the gas itself is heated. It then flows inwardly and becomes mixed with the vapors rising from the boiling mass of refractory material, so as to dilute these vapors and cause them to be condensed to the form of extremely finely divided spherical particles as the resulting gaseous mixture rises through the furnace chamber above the melting and boiling zone.

This process is advantageously carried out in a closed upright furnace chamber having highly heat resistant refractory walls. The refractories available for the construction of these walls usually soften at a temperature below the boiling point of the refractory material to be vaporized in the process. A plurality of electrodes are located in a lower part of the furnace chamber with their inner ends spaced apart to form therein a melting and boiling zone spaced inwardly from the side walls and above the floor of the chamber. Gas intakes are arranged in an upper part of the chamber in such manner that they will direct a cooling gas fed through them in downward directions extending along said side walls and thus will maintain a blanket of the gas over the exposed surfaces of said side walls. An offtake is provided in an upper part of said chamber, preferably near the center, for withdrawing the gaseous suspension formed above the melting and boiling zone, and means are provided for supplying continually into said zone the refractory material to be vaporized.

In the case of a cylindrical furnace chamber, the gas intakes preferably are tubes extending tangentially and downwardly through upper parts of the side walls themselves, whereby a spirally swirling blanket of the cooling gas is maintained next to the side walls of the chamber. In the case of a rectangular or oblong furnace chamber, the gas intakes may be arranged in the top of the structure and directed vertically downward at locations near to the side walls, so that they will keep the exposed surfaces of these walls covered by a downwardly moving blanket of the cooling gas.

The furnace can be constructed effectively as a resistance furnace, so that it will operate by passing an electric current between suitable electrodes through the molten refractory material, which acts as a conductor and resistance element. To start operation in such an embodiment, the space between the electrodes is bridged by a conducting material, such as pieces of carbon, after the floor of the furnace has been covered by a protective layer of loose refractory material, which may be the same as the material to be vaporized. The electrodes and carbon pieces are then covered by a further quantity of the refractory material to be vaporized, and current is applied to the electrodes. The flow of current heats the pieces of carbon to a high temperature, which in turn melts the refractory material, and the pieces of carbon are slowly consumed. Meanwhile, the molten refractory material itself becomes the resistance element. More current is then applied to increase the temperature to the boiling point of the molten material, and the flow of cooling gas into the furnace is started. This gas preferably is air, but other available gases such as steam, carbon dioxide, flue gases, nitrogen, or the like, may be used, depending somewhat upon the nature of the refractory material to be vaporized. Thereafter, the process proceeds as indicated hereinabove, with the continuous production of a gaseous suspension containing the desired product and the introduction of finely divided raw refractory material to the melting and boiling zone of the furnace chamber as needed to replenish the charge therein.

The accompanying drawings illustrate two forms of electrical resistance furnaces which are useful in carrying out the process. It is to be understood that these drawings are merely illustrative and that other forms and types of furnaces may be used. In the drawings, Fig. 1 is a vertical cross-section through a cylindrical resistance furnace;

Figure 1:
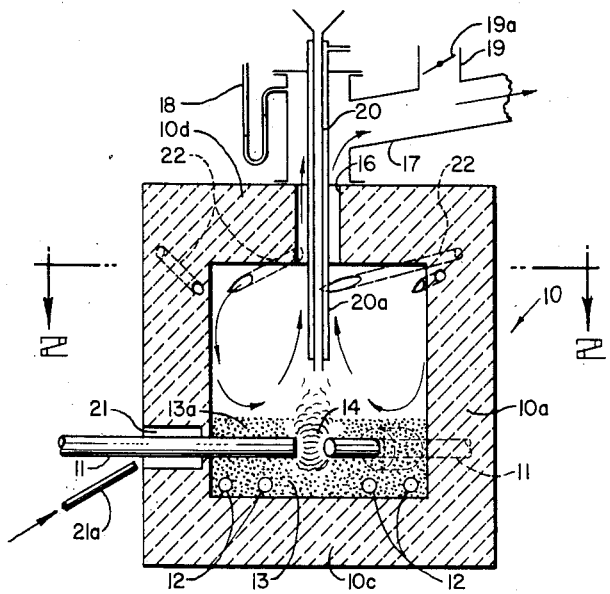
Figure 2:
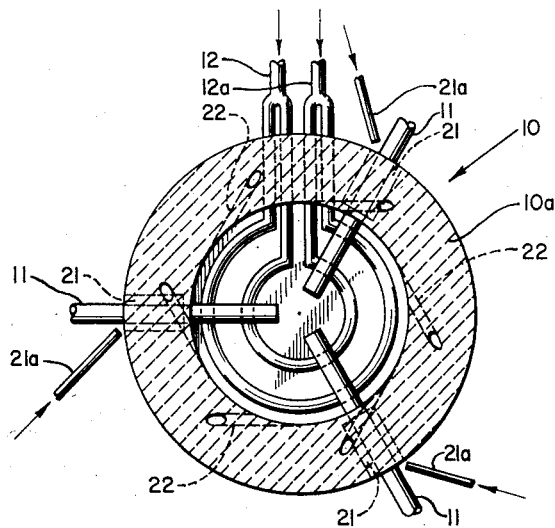
Fig. 2 is a horizontal cross-section through the same furnace, taken along line 2—2 of Fig. 1.

The cylindrical electric furnace illustrated in Figs. 1 and 2 comprises a cylindrical shell or body 10 of high temperature refractory material, such as silica brick having a high alumina content. Its side walls 10a are substantially vertical, and with the bottom 10c and the top 10d they define a closed upright furnace chamber. Three carbon electrodes 11 pass horizontally through the side walls 10a and are radially disposed at angular distances of about 120° in a plane spaced a short distance above the bottom wall 10c. The inner ends of the electrodes are spaced apart within the chamber so as to define therein a high temperature melting and boiling zone disposed away from the chamber walls.

The electrodes 11 are connected to a suitable source of three-phase alternating electric current (not shown). They may be equipped with means (not shown) for advancing them toward the center of the furnace chamber as they are consumed in the course of operations. A multiple of three electrodes may be used, if desired.

It is desirable to provide means for cooling the electrodes. This can be accomplished in the use of carbon electrodes, which are good heat conductors, by providing recesses or cups 21 in the side walls of furnace body 10 around the bodies of the respective electrodes. The cups 21 allow the electrodes to be cooled by air blown into the cups, for example, through tubes 21a, or cooling coils may be placed on the electrodes in the cups and connected to a source of cooling liquid, such as water, through electrically non-conductive tubing (not shown).

The floor of the furnace chamber defined by bottom wall 10c is preferably overlaid by cooling coils 12 through which a suitable cooling liquid may be circulated, and which are protected from the extreme temperatures of the boiling zone by a layer of loose charge material at 13.

A plurality of gas intakes 22 is provided in upper parts of the furnace side walls 10a for introducing the cooling gas into the chamber. These intakes may be connected to a suitable header and blower supplying air under a desired pressure. In the illustrated cylindrical furnace, the intakes 22 are tubes which extend through upper parts of the side walls 10a in laterally and downwardly sloped directions so that they impart tangential and downward components of motion to the gas introduced. By suitable choice of the size and number of such tangential tubes and the pressure of the gas supply, a spirally swirling flow of air or other cooling gas is readily formed and maintained over surfaces of the side walls 10a which otherwise would be exposed directly to destructive radiant heating from the boiling mass maintained at 14 between the ends of the electrodes. Further, this protective flow or blanket of air or other gas becomes heated as it descends in the furnace chamber, and then it flows inwardly over the boiling mass, and then upwardly through a central part of the chamber after becoming mixed with and diluting vapors formed by the boiling refractory material. As the resulting gaseous mixture rises in the chamber away from the boiling material, the diluted vapors are cooled and condensed to the form of extremely fine spherical particles suspended in the rising gas stream.

The top wall 10d of the furnace chamber is provided with an outlet at 16 through which the gaseous products of the furnace operation are continuously withdrawn and passed into an offtake duct 17. The pressure at the outlet 16 is kept substantially below the pressure of the air entering the chamber at the mouths of the intakes 22, so that the separate identities of the descending gas blanket and the ascending gaseous mixture or suspension are maintained in the course of the operations. A manometer shown diagrammatically at 18 indicates the pressure existing at the furnace outlet.

The offtake duct 17 extends away from the furnace to suitable collecting and screening apparatus (not shown), and it may be provided with an exhaust fan (not shown) to induce desired flow and pressure conditions. Near the furnace, it has a branch 19 fitted with a damper 19a, through which further amounts of a cooling gas may be introduced into the gaseous suspension withdrawn from the furnace, for either cooling the suspension or regulating the pressure at the furnace outlet.

The refractory material to be vaporized is introduced into the furnace, continuously or intermittently, through a suitable tube 20. This tube extends vertically into a central part of the furnace chamber to a location from which granular refractory material fed through the tube will fall by gravity into the mass of material between the ends of the electrodes 11. The tube 20 preferably is protected by a cooling liquid in a surrounding jacket 20a. It may be composed of iron, stainless steel or some other resistant metal or alloy, such as a high chromium iron alloy, or a ceramic material such as silicon carbide or Alundum may be used.

Figure 5:
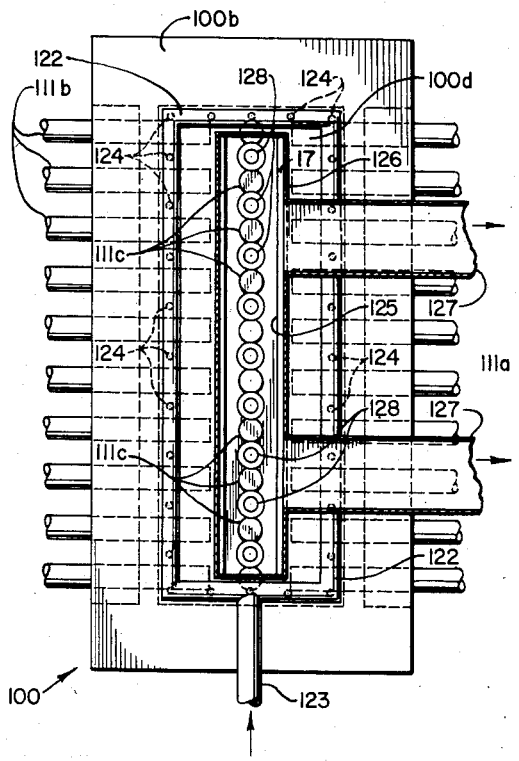
Fig. 5 is a horizontal cross-section taken along the line 5—5 of Fig. 3.
Figure 4:
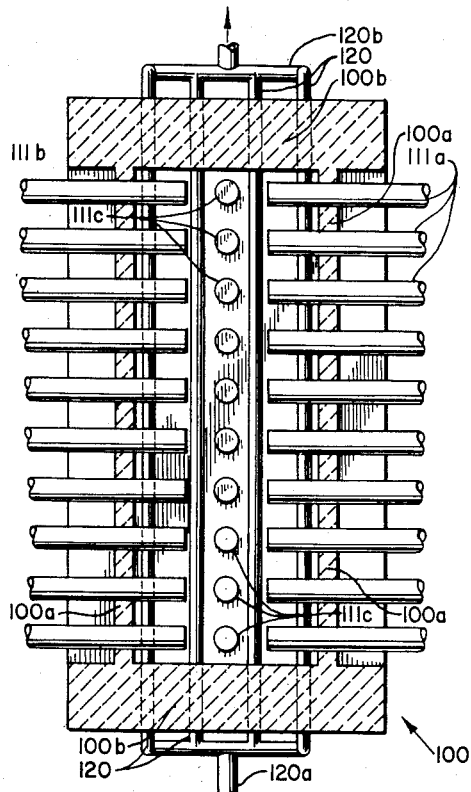
Fig. 4 is a horizontal cross-section through the rectangular furnace, taken along line 4—4 of Fig. 3.
Figure 3:
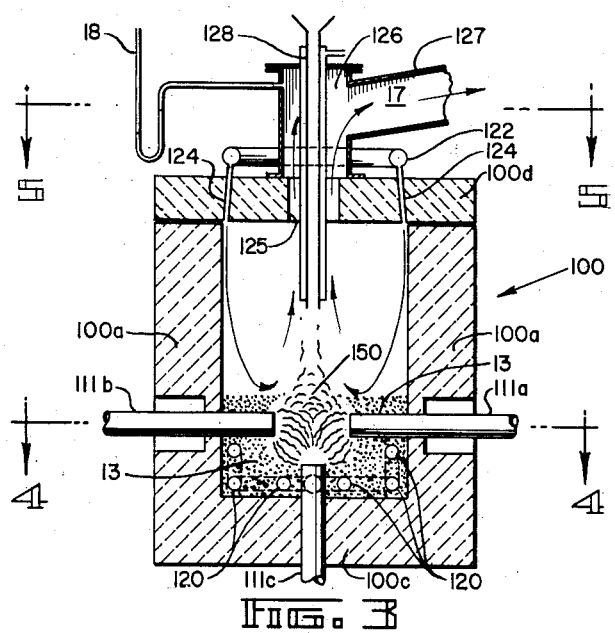
Fig. 3 is a transverse vertical cross-section through a rectangular form of resistance furnace.

The rectangular form of furnace shown in Figs. 3 to 5 embodies many of the features and arrangements of the cylindrical furnace of Figs. 1 and 2. It differs principally in that the elements are adapted to the rectangular shape of the furnace chamber and the flow of the cooling gas is directed vertically downward over the exposed surfaces of the side walls of the chamber.

Referring to Figs. 3 to 5, the body or shell 100 of the furnace in this embodiment is composed of a high temperature refractory material similar to that used in Figs. 1 and 2, and it comprises longitudinal side walls 100a, end walls 100b, a bottom wall 100c and a top wall 100d. Two series of horizontally disposed electrodes 111a and 111b extend through the opposite side walls 100a at a level spaced above the bottom wall 100c, and a third series of similar electrodes 111c extends vertically through the bottom wall 100c along the center line of the furnace chamber. The inner ends of the electrodes of the three series are spaced apart to form a high temperature melting and boiling zone disposed inwardly from the side walls and above the floor of the furnace chamber. Again, suitable means (not shown) are provided for supplying three-phase alternating current to the three series of electrodes, and the high temperatures necessary for the distillation of the refractory charge material are maintained through the resistance of molten charge material between the ends of the electrodes.

The chamber wall surfaces below the electrodes 111a and 111b are protected by a series of pipes 120 which extend along the bottom of the chamber and carry a suitable cooling liquid, such as water. As illustrated in Fig. 4, these pipes may be connected with an inlet header 120a at one end of the furnace and with an outlet header 120b at the other end. Before the furnace is placed in operation, the cooling pipes 120 are covered by a layer 130 of loose charge material, which retards the flow of heat to them from the high temperature melting and boiling zone at 150 (Fig. 3).

The rectangular top wall of the furnace is surmounted by a rectangular header 122 which receives a supply of air or other cooling gas through a feed duct 123. Extending vertically downward from the header 122, through spaced openings in the top wall 100d, are numerous tubes 124 which open into the furnace chamber at horizontally spaced points along the side walls 100a and the end walls 100b. The mouths of these tubes 124 direct the flow of air from the header downwardly along the exposed surfaces of the chamber side walls at a velocity sufficient to maintain a blanket of the air over those surfaces. When the air reaches the lower part of the furnace chamber, it flows inwardly over the boiling mass in zone 150, thus becoming mixed with and diluting the vapors there evolved and forming a gaseous mixture or suspension that rises through and out of a central portion of the chamber, in substantially the same manner as described in connection with Figs. 1 and 2. The outlet for the gaseous suspension is a long slot 125 along the center of top wall 100d. Covering this slot is an offtake header 126 from which ducts 127 extend away to suitable connections of the kind described in connection with duct 17 of Fig. 1. A manometer 18 indicates the pressure existing in the offtake header 126.

Instead of a single feed tube for the material to be vaporized, a series of tubes 128 is provided at intervals along the offtake header. The feed tubes 128 extend downwardly through the outlet 125 to a location from which they will deliver granular charge material by gravity into the melting and boiling zone at 150. They may be constructed in the same manner as feed tube 20 of Fig. 1.

The practice of this invention is further illustrated by the following example of operations in which the invention has been used for the production of an extremely finely divided spherical silica by the vaporization and condensation of raw silica in a cylindrical furnace of the character illustrated in Figs. 1 and 2:

The walls of the furnace used for these operations were made of a silica alumina refractory containing 60% of alumina. This material was rated as being able to withstand temperatures not exceeding 1400° C. The furnace chamber had an inside diameter of 28 inches and an inside height of 30 inches, and the side walls (cylindrical wall 100a) were 13 inches thick. Two inspection ports were provided in these walls, one directed toward the boiling zone at 14 and the other directed toward the opposite side wall. These ports could be opened briefly for visual inspection and for temperature measurements.

The furnace was fitted with three carbon electrodes, each about 2.5 inches in diameter, which extended horizontally through the side walls at a level about 6 inches above the floor of the chamber. Six tangentially disposed air intakes were provided at the top of the chamber, each being formed by a tube ¾ inch in diameter which was sloped downwardly at an angle of 15° and entered the chamber in tangential relation to its cylindrical side wall.

The electrodes were supplied with three-phase alternating current from a source having a capacity up to 100 kilowatts and a potential up to 200 volts. The electrodes were cooled by blowing air under low pressure into external cups surrounding them in the furnace structure. The floor of the furnace was cooled by circulating water through coils as indicated at 12 and 12a in Figs. 1 and 2. The feed tube at 20 was a water jacketed tube ½ inch in diameter, which extended downwardly into the furnace chamber to a location 12 inches above the level of the electrodes. The air intakes were connected with a source of air supplied under a pressure of up to 16 inches of water. The outlet from the chamber (at 16) was 5 inches in diameter and connected with an off-take duct 8 inches in diameter, which in turn delivered the gaseous product through an exhaust fan and thence to a bag filter for collection of the suspended solid material.

In starting the operations, the bottom of the furnace was filled with 30-mesh silica to a level even with the center of the electrodes. Carbon pieces ½ inch in diameter were then placed upon the silica to form a conducting bridge between the electrodes, and more silica was then added until the electrodes were covered to a depth of 2 inches. The flow of current was then started and increased until the material between the electrodes was melted and brought to a boiling condition. Air was then introduced through the intakes at a pressure equivalent to 6 inches of water; the exhaust fan was started; and the outlet pressure was adjusted by means of a damper (as at 19a) until the manometer 18 recorded a negative pressure equivalent to 2 mm. of water at the furnace outlet. The 30-mesh silica granules then were introduced continuously through the feed tube at the rate of about 7 pounds per hour.

The gaseous suspension produced and taken off in these operations yielded a silica powder composed of extraordinarily fine spherical particles. Examination of this product with an electron microscope showed that it consisted entirely of spherical particles varying in size between about 18 millimicrons and about 200 millimicrons, most of the particles being smaller than 50 millimicrons in maximum dimension.

After operating for several hours, the furnace continued steadily at an energy consumption of 55 kilowatts. As determined by use of a pyrometer at an inspection port, the temperature of the molten mass of silica between the electrodes appeared to be about 2200° C. The temperature of the gaseous suspension leaving the furnace outlet was about 1010° C.

The walls of the furnace were entirely undamaged after several days of operation, as shown by examination through the inspection ports. The temperature in the furnace side wall about 1 inch from its inside surface was about 710° C., as determined by a thermocouple embedded in the wall.

In order to illustrate the importance of the air flow through the intakes at 22, this flow was shut off and the exhaust mechanism adjusted so as to maintain a negative pressure of 2 mm. of water at the furnace outlet. After operating in this manner for one hour, the inner surface of the chamber walls began to glaze, and the temperature measured 1 inch from that surface had increased to 1240° C. In order to avoid disintegration of the furnace, it was necessary to resume the supply of cooling air, and after a few hours of further operation the furnace had again reached its former equilibrium.

The extremely fine silica produced according to this invention has important utility in the manufacture of light and colored rubber products, to which it imparts the strength and toughness characteristics of rubbers pigmented with carbon black. It also has many other uses for purposes of the kind already mentioned hereinabove.

The process and furnaces of this invention can be used for the distillation of a wide variety of refractory inorganic materials, including kaolin and other clays, sodaglass, fluorspar ($CaF_2$), alumina, mixtures of sand and feldspar, sand and lime, sand and sodium chloride, or sand and zinc oxide, and other materials having very high melting and boiling points. While the invention is especially advantageous because of its usefulness for the distillation of such high boiling refractory materials, it is evident that the techniques employed may also find important applications to the distillation of inorganic materials having lower boiling points, because of the extremely fine size and the spherical form of the particles produced in the furnace. The disclosed manner of mixing and diluting the nascent vapors with the cooling gas enables the size of the condensed particles to be controlled accurately and to be varied by varying the flow of the gas.

The energy requirements of the furnace vary with the nature of the material vaporized. The smoothness and efficiency of the operations are enhanced when a relatively fluid molten mass is maintained between the electrodes, and for this purpose it is advantageous to process mixtures of the high temperature refractory material with suitable fluxing materials, for example, the sand mixtures mentioned above. The use of such mixtures has the further advantage that it permits operation of the furnace at a lower temperature and thus contributes to savings of current and to a longer service life of the electrodes. For example, when actual operations as described hereinabove were carried out with a mixture of equal parts of sodaglass and silica, in place of silica alone, the observed temperature of the molten mass between the electrodes decreased from about 2200° C. to about 1880° C.

The fineness of the condensed particles produced in the process is affected by the amount and the temperature of the cooling gas entering the vaporization zone, where the gas becomes mixed with the vapors evolved from the molten charge materials. In general, smaller particles are produced when this gas has a higher temperature and a relatively large volume increasing its diluting action upon the rising vapors.

Many variations may be made in the manner of carrying out the present process and in the construction and operation of the furnace used, without departing from the principles of this disclosure or the scope of the invention defined in the appended claims.

We claim:

1. A process for producing a finely divided inorganic filler or pigment from a refractory inorganic material, which comprises melting and boiling a mass of said refractory material within an upright furnace chamber in a zone spaced inwardly from the walls and located in a lower portion of said chamber, while simultaneously flowing a cooling gas downwardly along side walls of the chamber to limit their temperature and then inwardly over the boiling mass so that said gas mixes with and dilutes vapors of said material rising from said mass, and condensing said vapors in the resulting gaseous mixture.

2. A process for producing a finely divided inorganic filler or pigment from a refractory inorganic material, which comprises melting and boiling a mass of said refractory material within an upright furnace chamber in a zone spaced inwardly from the walls and located in a lower portion of said chamber, while simultaneously flowing a cooling gas downwardly along the side walls of the chamber and then inwardly over the boiling mass so that said gas mixes with and dilutes vapors of said material rising from said mass, condensing said vapors in the resulting gaseous mixture in a zone of said chamber above said mass, and withdrawing a gaseous suspension of fine condensed solid particles from an upper part of said chamber.

3. A process for producing finely divided siliceous material, which comprises melting and boiling a mass of siliceous material within an upright furnace chamber in a zone spaced inwardly from the walls and located in a lower portion of said chamber, while simultaneously flowing a cooling gas downwardly along the side walls of the chamber and then inwardly over the boiling mass so that said gas mixes with and dilutes vapors of said material rising from said mass, condensing said vapors in the resulting gaseous mixture in a zone of said chamber above said mass, and withdrawing a gaseous suspension of fine siliceous particles from an upper part of said chamber.

4. A process for producing finely divided siliceous material, which comprises melting and boiling a mass of siliceous material within an upright furnace chamber in a zone spaced inwardly from the walls and located in a lower portion of said chamber, said material comprising silica and a fluxing agent that reduces its melting point, simultaneously flowing a cooling gas downwardly along the side walls of the chamber and then inwardly over the boiling mass so that said gas mixes with and dilutes vapors of said material rising from said mass, condensing said vapors in the resulting gaseous mixture in a zone of said chamber above said mass, and withdrawing a gaseous suspension of fine siliceous particles from an upper part of said chamber.

5. A process for producing a finely divided inorganic filler or pigment from a refractory inorganic material, which comprises melting and boiling a mass of said refractory material within an upright furnace chamber in a zone spaced inwardly from the walls and located in a lower portion of said chamber, simultaneously flowing air downwardly along side walls of the chamber to limit their temperature and then inwardly over the boiling mass so that the air in a heated condition mixes with and dilutes vapors of said material rising from said mass, and condensing said vapors and carrying off the condensate in the resulting gaseous mixture.

6. A process for producing a finely divided inorganic filler or pigment from a refractory inorganic material, which comprises melting and boiling a mass of said refractory material within an upright cylindrical furnace chamber in a zone spaced inwardly from the walls and located in a lower portion of said chamber, simultaneously flowing a cooling gas tangentially against and downwardly along the cylindrical wall of the chamber and then inwardly over the boiling mass so that said gas mixes with and dilutes vapors of said material rising from said mass, condensing said vapors in the resulting gaseous mixture in a zone of said chamber above said mass, and withdrawing a gaseous suspension of fine condensed particles from a central and upper part of said chamber.

7. A process for producing a finely divided inorganic filler or pigment from a refractory inorganic material, which comprises melting and boiling a mass of said refractory material within an upright furnace chamber in a zone spaced inwardly from the walls and located in a lower portion of said chamber, simultaneously flowing a cooling gas downwardly along side walls of the chamber to limit their temperature and then inwardly over the boiling mass so that said gas mixes with and dilutes vapors of said material rising from said mass, condensing said vapors in the resulting gaseous mixture in a zone of said chamber above said mass, and continuously withdrawing a resulting gaseous suspension of fine condensed solid particles from an upper central part of said chamber.

8. A furnace for distilling a refractory material to form a finely divided inorganic filler or pigment, comprising a closed upright furnace chamber having heat resistant refractory side walls, electrodes in a lower part of said chamber having their inner ends spaced apart to form a melting and boiling zone disposed away from the walls of said chamber, gas intakes in an upper part of said chamber and directed downwardly thereinto along inner surfaces of said side walls for flowing a cooling gas thereinto downwardly and along said side walls so as to maintain a blanket of said gas over exposed surfaces of said side walls, an outlet in an upper part of said chamber for withdrawing therefrom a gaseous suspension formed therein above said melting and boiling zone, and means for supplying into said zone the refractory material to be distilled.

9. A furnace for distilling a refractory material to form a finely divided inorganic filler or pigment, comprising a closed upright cylindrical furnace chamber having heat resistant refractory side walls, electrodes in a lower part of said chamber having their inner ends spaced apart to form a melting and boiling zone disposed away from said walls, gas intakes in an upper part of said chamber and directed tangentially and downwardly thereinto for flowing a cooling gas tangentially and downwardly over the exposed inner surface of the cylindrical chamber wall to maintain a blanket of said gas thereover, an outlet in an upper and central part of said chamber for withdrawing therefrom a gaseous suspension formed therein above said melting and boiling zone, and means for supplying into said zone the refractory material to be distilled.

10. A furnace for distilling a refractory material to form a finely divided inorganic filler or pigment, comprising a closed upright furnace chamber having heat resistant refractory walls, electrodes in a lower part of said chamber having their inner ends spaced apart to form a melting and boiling zone disposed away from said walls, gas intakes in an upper part of said chamber and directed downwardly thereinto along inner surfaces of its side walls for flowing a cooling gas thereinto downwardly and over the exposed side walls of the chamber to maintain a blanket of said gas thereover, an outlet in an upper central part of said chamber for withdrawing therefrom a gaseous suspension formed therein above said melting and boiling zone, and offtake means connected with said outlet, including means for maintaining it under a sub-atmospheric pressure.

11. A furnace for distilling a refractory material to form a finely divided inorganic filler or pigment, comprising a closed upright furnace chamber having heat resistant refractory side walls, electrodes in a lower part of said chamber having their inner ends spaced apart to form a melting and boiling zone disposed away from the walls of said chamber, gas intakes in an upper part of said chamber and directed downwardly thereinto along inner surfaces of said side walls for flowing a cooling gas thereinto downwardly and along said side walls so as to maintain a blanket of said gas over exposed surfaces of said side walls, an outlet in an upper part of said chamber for withdrawing therefrom a gaseous suspension formed therein above said melting and boiling zone, means for supplying into said zone the refractory material to be distilled, and cooling coils arranged over the floor of said chamber to protect it against the heat of said zone, said coils being spaced below said zone so as to be protectable by an intervening layer of loose refractory material.

12. A process for the high temperature treatment of refractory material, which comprises providing a limited mass containing a refractory material in the lower portion of a heat-insulating furnace chamber, melting said mass and vaporizing material from it in a limited heating zone spaced away from the walls of said chamber, simultaneously flowing a relatively cool gas first over surfaces of said walls exposed to heat radiation from said zone, to limit their temperature, and then over and away from the molten mass to mix with and carry off the vaporized material, and condensing the vaporized material in the resulting gaseous mixture.

13. A process for the high temperature treatment of refractory material, which comprises providing a limited mass containing a refractory material in the lower portion of a heat-insulating furnace chamber, melting said mass and vaporizing material from it by passing electrical energy through it in a limited heating zone spaced away from the walls of said chamber, simultaneously flowing a relatively cool gas first over surfaces of said walls exposed to heat radiation from said zone, to limit their temperature, and then over and away from the molten mass to mix with and carry off the vaporized material, and condensing the vaporized material in the resulting gaseous mixture.

14. A process for the high temperature treatment of refractory material, which comprises providing a limited mass containing a refractory material in the lower portion of a heat-insulating furnace chamber, melting said mass and vaporizing material from it in a limited heating zone spaced away from the walls of said chamber, simultaneously flowing a relatively cool gas first over surfaces of said walls exposed to heat radiation from said zone, to limit their temperature, and then over and away from the molten mass to mix with and carry off the vaporized material, condensing the vaporized material in the resulting gaseous mixture, and maintaining a protective layer of solid refractory material between the molten mass and the floor of said chamber.

15. A process for the high temperature treatment of refractory material, which comprises providing a limited mass containing a refractory material in the lower portion of a heat-insulating furnace chamber, melting said mass and vaporizing material from it in a limited heating zone spaced away from the walls of said chamber, simultaneously flowing a relatively cool gas first over surfaces of said walls exposed to heat radiation from said zone, to limit their temperature, and then over and away from the molten mass to mix with and carry off the vaporized material, condensing the vaporized material in the resulting gaseous mixture, and replenishing said mass by feeding granular refractory material into said zone through the gas flowing thereover.

References Cited in the file of this patent

UNITED STATES PATENTS

| 658,536 | Westman | Sept. 25, 1900 |
| 742,419 | Harmet | Oct. 27, 1903 |
| 782,922 | Price | Feb. 21, 1905 |
| 826,745 | Price | July 24, 1906 |
| 1,311,379 | Bleecker et al. | July 29, 1919 |
| 1,430,971 | Fornander | Oct. 3, 1922 |
| 1,995,803 | Gilbert | Mar. 26, 1935 |
| 2,564,783 | Howard | Aug. 21, 1951 |

FOREIGN PATENTS

| 506,001 | Belgium | Oct. 15, 1951 |